United States Patent [19]

Canterino et al.

[11] Patent Number: 4,579,912

[45] Date of Patent: Apr. 1, 1986

[54] FILMS OF BLENDS OF LINEAR ETHYLENE POLYMERS AND AROMATIC POLYMERS

[75] Inventors: Peter J. Canterino, Towaco; David V. Dobreski, East Windsor; Richard G. Shaw, Bradley Beach, all of N.J.

[73] Assignee: Mobil Oil Corporation, New York, N.Y.

[21] Appl. No.: 685,583

[22] Filed: Dec. 24, 1984

Related U.S. Application Data

[63] Continuation-in-part of Ser. No. 553,901, Nov. 21, 1983, abandoned, and a continuation-in-part of Ser. No. 676,979, Nov. 30, 1984.

[51] Int. Cl.$^4$ .......................... C08L 23/8; C08L 23/18; C08L 25/04
[52] U.S. Cl. ...................................... 525/240; 525/98; 525/931; 525/88
[58] Field of Search ..................... 525/240, 931, 98, 88

[56] References Cited

U.S. PATENT DOCUMENTS

| | | | |
|---|---|---|---|
| 3,274,328 | 9/1966 | Davis | 525/240 |
| 3,993,718 | 11/1976 | Bontinck et al. | 525/931 |
| 4,255,531 | 3/1981 | Arlut | 525/237 |
| 4,260,565 | 4/1981 | D'Amico et al. | 525/931 |
| 4,386,188 | 5/1983 | Grancio et al. | 525/96 |

FOREIGN PATENT DOCUMENTS 56-038338  4/1981  Japan .

OTHER PUBLICATIONS

Chemical Week 2/82, "A Better Syrene . . ." pp. 42–45.
Package Engineering, 2/80, "New Polyethylenes" pp. 39–40.
Plastics World, 12/79, "New Materials" p. 86.

*Primary Examiner*—Carman J. Seccuro
*Attorney, Agent, or Firm*—Alexander J. McKillop; Michael G. Gilman; Edward J. Trojnar

[57] ABSTRACT

Linear low density copolymers (LLDPE) are blended with up to about 10 weight percent of an aromatic polymer, e.g., polystyrene or poly(para-methylstyrene), to give films having improved MD tear strength or equivalent MD tear strength and higher stiffness compared to the LLDPE alone. Also, extruder torque is lower and bubble stability is greater in blown film extrusion with the blends as well as in blends in which medium or high density polyethylene is used instead of the LLDPE.

9 Claims, No Drawings

FILMS OF BLENDS OF LINEAR ETHYLENE POLYMERS AND AROMATIC POLYMERS

CROSS-REFERENCE TO RELATED APPLICATION

This application is a continuation-in-part of copending application Ser. No. 553,901 filed Nov. 21, 1983, now abandoned, and of an application Ser. No. 676,979 filed Nov. 30, 1984 in the names of Peter J. Canterino and Richard G. Shaw as a continuation-in-part of Ser. No. 553,901.

BACKGROUND OF THE INVENTION

Linear low and medium density polyethylene copolymers (LLDPE), and linear high density polyethylene are known materials which are widely commercially available. LLDPE is also described in U.S. Pat. No. 4,076,698 which is incorporated herein by reference. A commercially important use of LLDPE is in films which are conventionally prepared by blown film extrusion. Such films have generally good properties but often exhibit undesirably low stiffness for some uses and have marginal MD tear characteristics. In accordance with this invention, MD tear can be improved by blending LLDPE with aromatic polymers such as polystyrene or poly(para-methylstyrene). Alternatively, the stiffness of LLDPE can be improved without loss of MD tear. At the same time processing is improved, particularly in reduced extruder torque and in better bubble stability in the blown film.

SUMMARY OF THE INVENTION

In one aspect, this invention relates to films comprising blends of linear ethylene polymers and small amounts of, up to about 10 weight percent of aromatic polymers such as polystyrene or poly(para-methylstyrene). Another aspect of the invention relates to a method for reducing extruder torque by the use of such blends. Still another aspect of the invention relates to the method of improving the bubble stability in blown films made from such ethylene polymers by incorporating the aromatic polymer.

DETAILED DESCRIPTION OF THE INVENTION

In accordance with this invention, the MD tear strength of ehtylene polymers, particularly LLDPE can be improved or, as is often desirable, the same MD tear strength can be obtained in a film of greater stiffness (see Secant modulus). This is accomplished by blending up to about 10 weight percent, preferably up to about 8 weight percent, and most preferably between about 3 and 8 weight percent of an aromatic polymer.

The ethylene polymers which are suitable for use in this invention are those prepared by low pressure techniques. Many such polymers are commercially available. Particularly suitable are LLDPE resins which are copolymers of ethylene and higher olefins, particularly 1-butene, 1-hexene, and 1-octene. These LLDPE copolymers generally have a density of between 0.90 and 0.94, preferably between 0.91 and 0.93.

Polystyrene and poly(para-methylstyrene) resins are particularly suitable as the aromatic polymer which is blended with the ethylene polymer. Preferably, the aromatic polymer is selected so that its melt viscosity is less than the melt viscosity of the ethylene resin used. The disparity in viscosity appears to contribute to better Elmendorf tear strength of the blends. Also, the best tear strength is obtained with blends in which the LLDPE itself has good tear properties. Such blends result in films with good tear and impact properties, and the higher modulus characteristic of a higher density LLDPE film.

Compatibilizers can be used in small amounts up to about 2 weight percent of the composition. Suitable compatibilizers include block copolymers of styrene-ethylene propylene-styrene (Kraton G), block copolymers of styrene and ethylene (Shelvis) and ethylene propylene copolymers (Vistalon 3707). The resin blends and films are made in the conventional manner. Preferably, films are made by blown film extrusion using conventional techniques to obtain films which are generally from about 0.5 to 5 mils in thickness.

The following non-limiting examples are illustrative of this invention. Unless otherwise noted all parts are by weight.

EXAMPLES 1-10

Blends of various linear low density copolymers (LLDPE) with paramethylstyrene polymers (PPMS) were compounded at 160° C. with a Brabender twin screw extruder. Films having a 1.5 mil gauge were produced at 2:1 BUR, 40 mil gap at about 18 g/min output. Film properties are summarized in Table I below.

TABLE I

| | | | Film Properties | | |
|---|---|---|---|---|---|
| Ex. | LLDPE | Weight Percent PPMS | MD Tear (g/mil) | TD Tear (g/mil) | Spencer Impact (g/mil) |
| — | Dowlex 2045 | 0 | 412 | 733 | 1057 |
| 1 | Dowlex 2045 | 5 | 500 | 612 | 903 |
| 2 | Dowlex 2045 | 10 | 306 | 444 | 356 |
| — | Dowlex 2049 | 0 | 261 | 672 | 529 |
| 3 | Dowlex 2049 | 5 | 393 | 490 | 358 |
| 4 | Dowlex 2049 | 10 | 237 | 399 | 252 |
| — | Dowlex 2047 | 0 | 402 | 683 | 478 |
| 5 | Dowlex 2047 | 5 | 493 | 511 | 382 |
| 6 | Dowlex 2047 | 10 | 488 | 554 | 255 |
| — | GPX-1 | 0 | 144 | 325 | 551 |
| 7 | GPX-1 | 5 | 145 | 259 | 221 |
| 8 | GPX-1 | 10 | 109 | 166 | 204 |
| — | GP-2 | 0 | 128 | 325 | 311 |
| 9 | GP-2 | 5 | 170 | 251 | 192 |
| 10 | GP-2 | 10 | 168 | 207 | 150 |

The Dowlex LLDPE resins are ethylene-octene copolymers commercially available from Dow Chemical Company.

GPX-1 and GP-2 are ethylene-butene copolymers having a density of about 0.918 and Melt Indexes of about 1 and 2 respectively.

The PPMS is a free-radical catalyzed resin having a Mw of about 300,000 and a Mw/Mn of about 3.5.

EXAMPLE 11

Substitution of polystyrene for the PPMS in Example 10, in amounts of 8 to 10 weight percent, gives a blend with enough elasticity to give a stable bubble at higher output rates than the LLDPE alone. Films made of the blend exhibit similar or improved MD tear compared to LLDPE alone but with a desirable increase in stiffness (Secant Modulus).

EXAMPLE 12

Blends of ethylene-hexene copolymer and polystyrene gave films with improved stiffness and acceptable MD tear strength for that stiffness. Suitable ethylene-hexene copolymers include a copolymer having a Melt Index of 0.75 and a density of 0.927 and a copolymer having a Melt Index of 1.0 and a density of 0.92.

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

We claim:

1. A blown film consisting essentially of at least 90 weight percent of a low density linear ethylene copolymer of ethylene and a higher olefin and up to 10 percent by weight of the total composition of a thermoplastic polymer of an aromatic hydrocarbon; said film having an MD tear strength which is greater than, and a TD tear strength which is at least 50 percent that of a corresponding film without said aromatic polymer.

2. The film of claim 1 in which said thermoplastic polymer of an aromatic hydrocarbon is a polymer of styrene containing polymerized styrene as its predominant constituent.

3. The film of claim 1 in which said thermoplastic polymer of an aromatic hydrocarbon is polystyrene.

4. The film of claim 1 in which said thermoplastic polymer of an aromatic hydrocarbon is a polymer of para-methylstyrene containing polymerized para-methylstyrene as its predominant constituent.

5. The film of claim 1 in which said low density linear ethylene copolymer is a copolymer of ethylene and a higher olefin having 4-8 carbon atoms and a density of less than 0.94.

6. The film of claim 1 in which said low density linear ethylene copolymer is a copolymer of ethylene and a higher olefin having 4-8 carbon atoms and a density of less than 0.94 and said polymer of an aromatic hydrocarbon is polystyrene.

7. The film of claim 1 in which said low density linear ethylene copolymer is a copolymer of ethylene and a higher olefin having 4-8 carbon atoms and a density of less than 0.94 and said polymer of an aromatic hydrocarbon is poly(para-methyl styrene).

8. The film of claim 6 in which said polymer of an aromatic hydrocarbon comprises up to 8 percent by weight of the composition.

9. The film of claim 1 which contains in addition up to 5 weight percent based on the total composition of a hydrogenated block copolymer of styrene and butadiene.

* * * * *